United States Patent [19]

LeMoine

[11] 4,404,989

[45] Sep. 20, 1983

[54] UNDERWATER CONNECTOR FOR FLUID LINES

[75] Inventor: Joseph L. LeMoine, Houston, Tex.

[73] Assignee: Koomey, Inc., Brookshire, Tex.

[21] Appl. No.: 289,566

[22] Filed: Aug. 3, 1981

[51] Int. Cl.³ .............................................. F16L 29/00
[52] U.S. Cl. ............................ 137/596.18; 137/236 S; 137/798; 137/884; 166/344; 285/137 R
[58] Field of Search .............. 137/236 S, 594, 596.18, 137/798, 884; 166/338, 339, 341, 344; 285/131, 137 R, 25, 26, 28, 29

[56] References Cited

U.S. PATENT DOCUMENTS

| | | | |
|---|---|---|---|
| 3,460,614 | 8/1969 | Burgess | 166/0.6 |
| 3,701,549 | 10/1972 | Koomey et al. | 285/24 |
| 3,817,281 | 6/1974 | Lewis et al. | 137/594 |
| 3,957,079 | 5/1976 | Whiteman | 137/884 |
| 4,328,826 | 5/1982 | Baugh | 137/884 |

*Primary Examiner*—Gerald A. Michalsky
*Attorney, Agent, or Firm*—Fulbright & Jaworski

[57] ABSTRACT

An underwater fluid connector for interconnecting a plurality of fluid lines. A first male member or plurality of members are adapted to be positioned underwater including at least one upright position flat side with a plurality of fluid passageways terminating at said side. An inverted U-shaped retrievable female member having first and second flat interior faces and adapted to engage and disengage from the first member wherein the faces are positioned for alignment with but spaced from the first member flat side when engaged for providing a venting space therebetween and having a plurality of passageways terminating at the interior faces for axial alignment with the first member passageways. A metal valve seat is releasably connected to the first member flat sides about each of the first member passageways. A valve is positioned in each of the second member passageways having a movable element, a hydraulic supply port, and a pilot actuator connected to the valve element. In one position the valve element seats on the valve seat and opens the fluid supply port and in a second position closes the fluid supply port and is removed from the valve seat. A resilient seal is connected to the valve element and adapted to seat on the metal valve seat. The seat and seal are circular and the seat includes a circular lip having a width less than the resilient seal for providing higher unit sealing forces.

5 Claims, 5 Drawing Figures

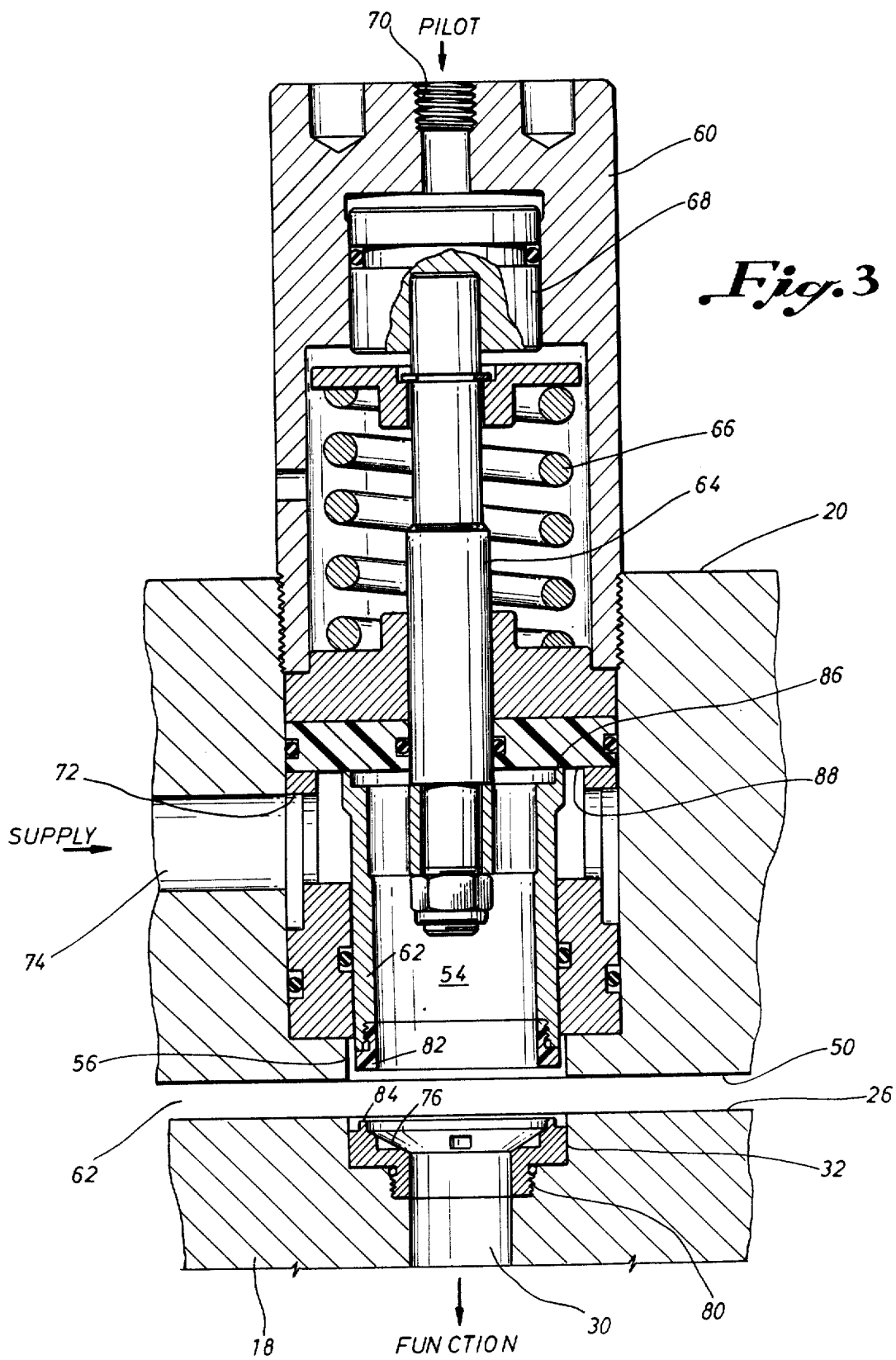

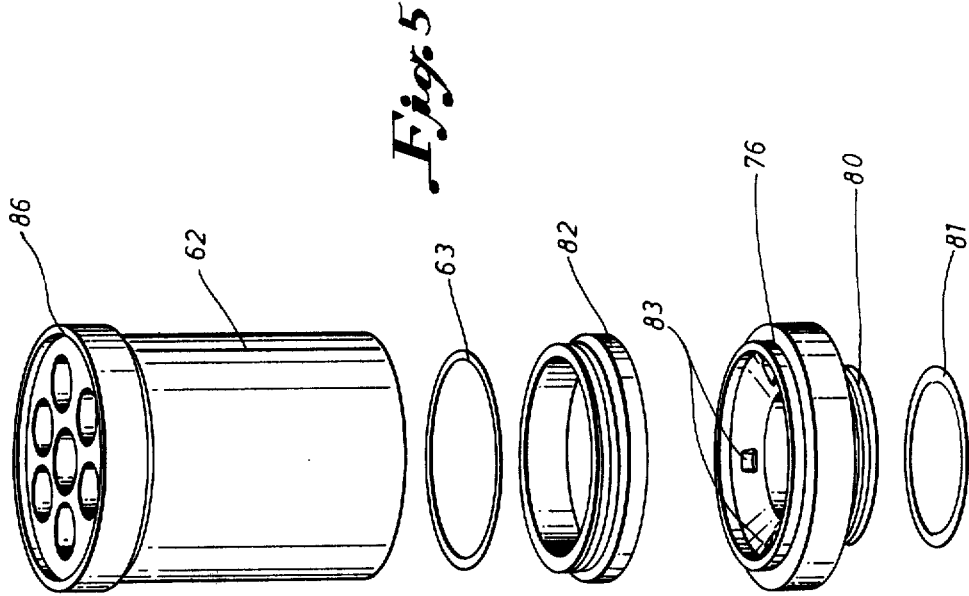
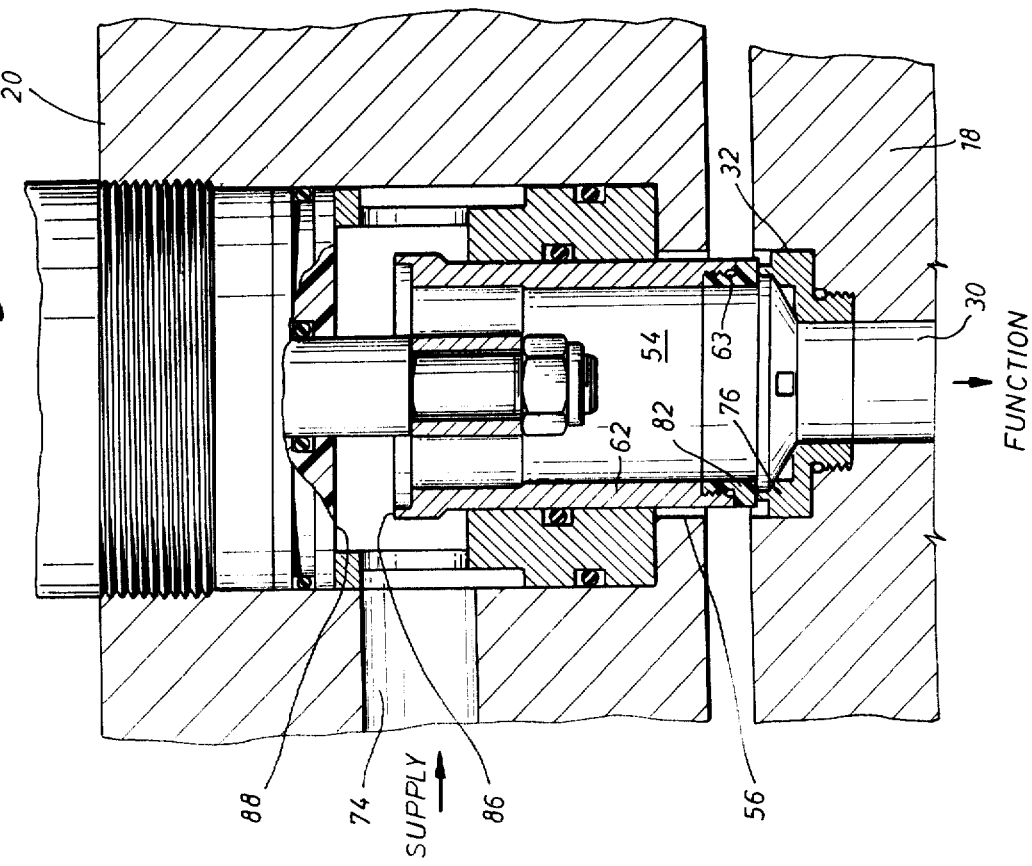

UNDERWATER CONNECTOR FOR FLUID LINES

BACKGROUND OF THE INVENTION

It is old to provide underwater fluid connectors or subsea control pods, such as shown in U.S. Pat. Nos. 3,460,614; 3,701,549; and 3,817,281 for controlling various wellhead drilling functions such as blowout preventers. The prior art pods generally include male and female coacting surfaces having fixed seals which are engaged upon contact between the male and female members causing wear and tear on the seals. The present invention is directed to an underwater fluid control connector having various improvements.

SUMMARY

The present invention is directed to an underwater connector for interconnecting a plurality of fluid lines including a first member adapted to be positioned underwater having at least one upright position flat side having a plurality of fluid passageways terminating at said side. A second member is adapted to engage and disengage from the first member and includes one upright position flat face for alignment with but spaced from the first flat side when engaged for providing a venting space therebetween and having a plurality of passageways terminating at said second member flat face for axial alignment with the first member passageways. A valve seat is releasably connected to the first member flat side about each of the first member passageways. A valve is positioned in the second member passageways having a movable valve element, hydraulic fluid supply port and a pilot actuated means connected to and actuating the valve element. The valve element when moved to one position seats on the valve seat on the first member and opens the supply port for providing actuating fluid to the second member and when moved to the second position closes the supply port and is removed from the valve seat and allows fluid in the first member to vent into the space.

A still further object of the present invention is a resilient seal connected to the valve element and adapted to seat on the valve seat when the first and second members are connected but which retracts and does not engage the valve seat while the members are being engaged and disengaged.

Yet a still further object of the present invention is the provision wherein the valve seat is of metal and thus may remain underwater without need of replacing and wherein the seat and the seal are circular and the seat includes a circular lip having a width less than the width of the resilient seal for providing higher unit sealing forces.

Other and further objects, features and advantages will be apparent from the following description of a presently preferred embodiment of the invention given for the purpose of disclosure and taken in conjunction with the accompanying drawings.

BRIEF DESCRIPTION OF THE DRAWINGS

FIG. 3 is an enlarged fragmentary cross-sectional view of the improved valve of the present invention shown in its retracted position, FIG. 4 is a fragmentary elevational view, partly in cross-section, illustrating the valve of the present invention in its extended position, and FIG. 5 is an exploded elevational view of portions of the valve of FIGS. 3 and 4.

DESCRIPTION OF THE PREFERRED EMBODIMENT

Figure 1:
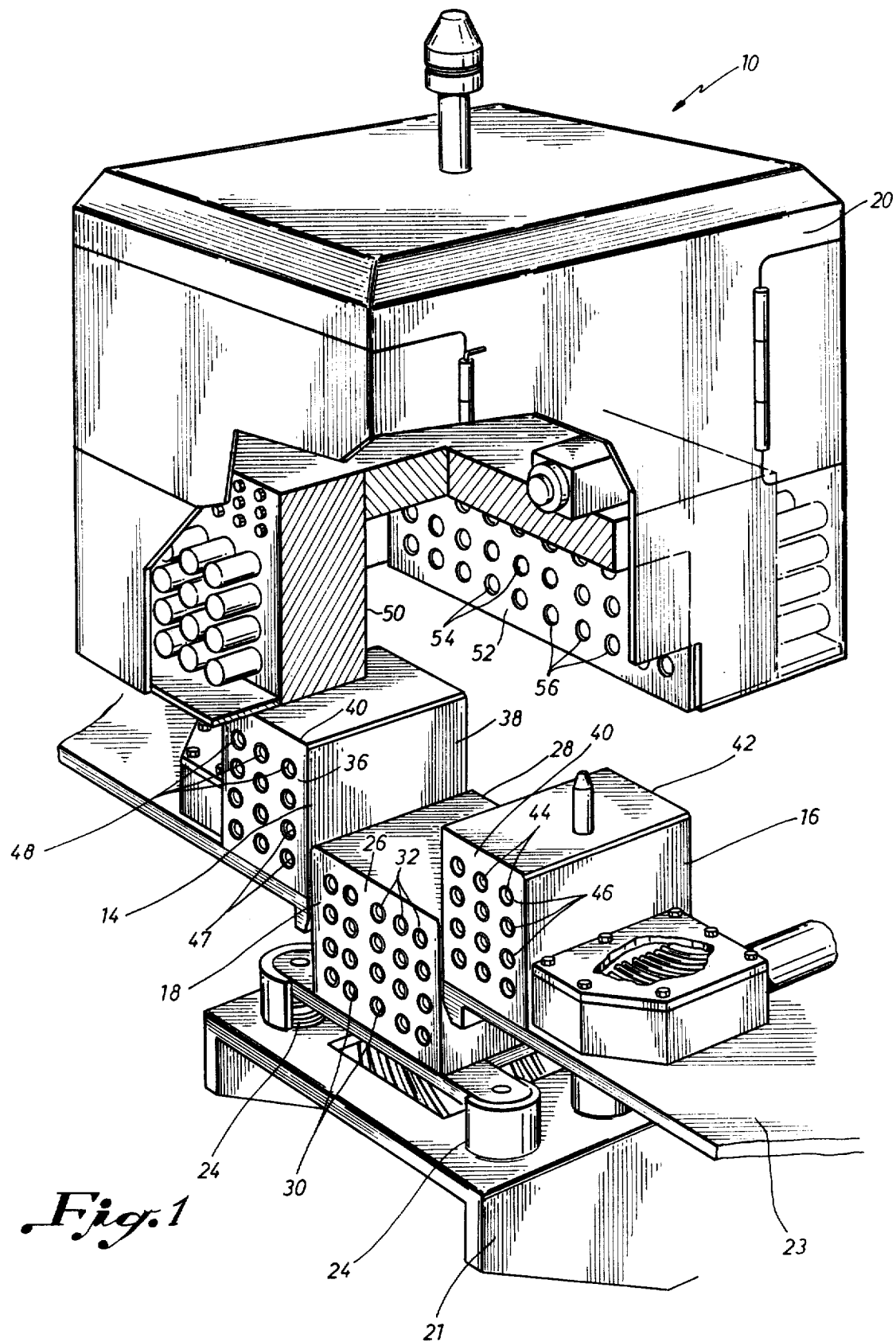
FIG. 1 is an exploded perspective elevational view of the present invention.

Referring now to the drawings, particularly to FIG. 1, the reference numeral 10 generally indicates the underwater connector of the present invention with improved valving. While the particular underwater connector hereinafter described is the preferred embodiment for use with the improved valving, other types of connectors may be utilized.

The connector 10 includes underwater members 14, 16 and 18, which are adapted to be positioned and remain underwater, and a retrievable member generally indicated by the reference numeral 20 which is adapted to be releasably engaged and disengaged from the underwater members 14, 16 and 18. Suitable frame members 21 and 23 provide support for the underwater members 14, 16 and 18. The retrievable member 20 is supported and guided from the water surface as is conventional. Member 18 is supported from the well support 21 by a plurality of springs 24 and is connected by a plurality of hoses (not shown) to various blowout preventer stack functions. The member 18 is a solid male member having first and second opposing exterior flat sides 26 and 28 which extend upwardly and are preferably vertical. A plurality of fluid passageways 30 are provided in the male member 18 extending from fluid ports 32 in each of the faces 26 and 28.

Second and third underwater male members 14 and 16 are provided connected to an oil well riser by the support 21. One of the members 14 is positioned at one end of the first member 18 and the other member 16 is positioned at the opposite end of the first member 18. Each of the second and third male members 14 and 16 have opposing exterior flat sides positioned uprightly and preferably vertically. Thus member 14 includes flat sides 36 and 38 while member 16 includes flat sides 40 and 42. Each of the members 14 and 16 include a plurality of fluid passageways extending from ports on each side. Thus, male member 16 includes fluid passageways 44 extending from ports 46 in each of sides 40 and 42. Male member 14 includes similar passageways 47 extending from ports 48 from each of the sides 36 and 38. It is to be noted from FIG. 2 that the male members 14, 16 and 18 are positioned together at the same elevation.

Figure 2:
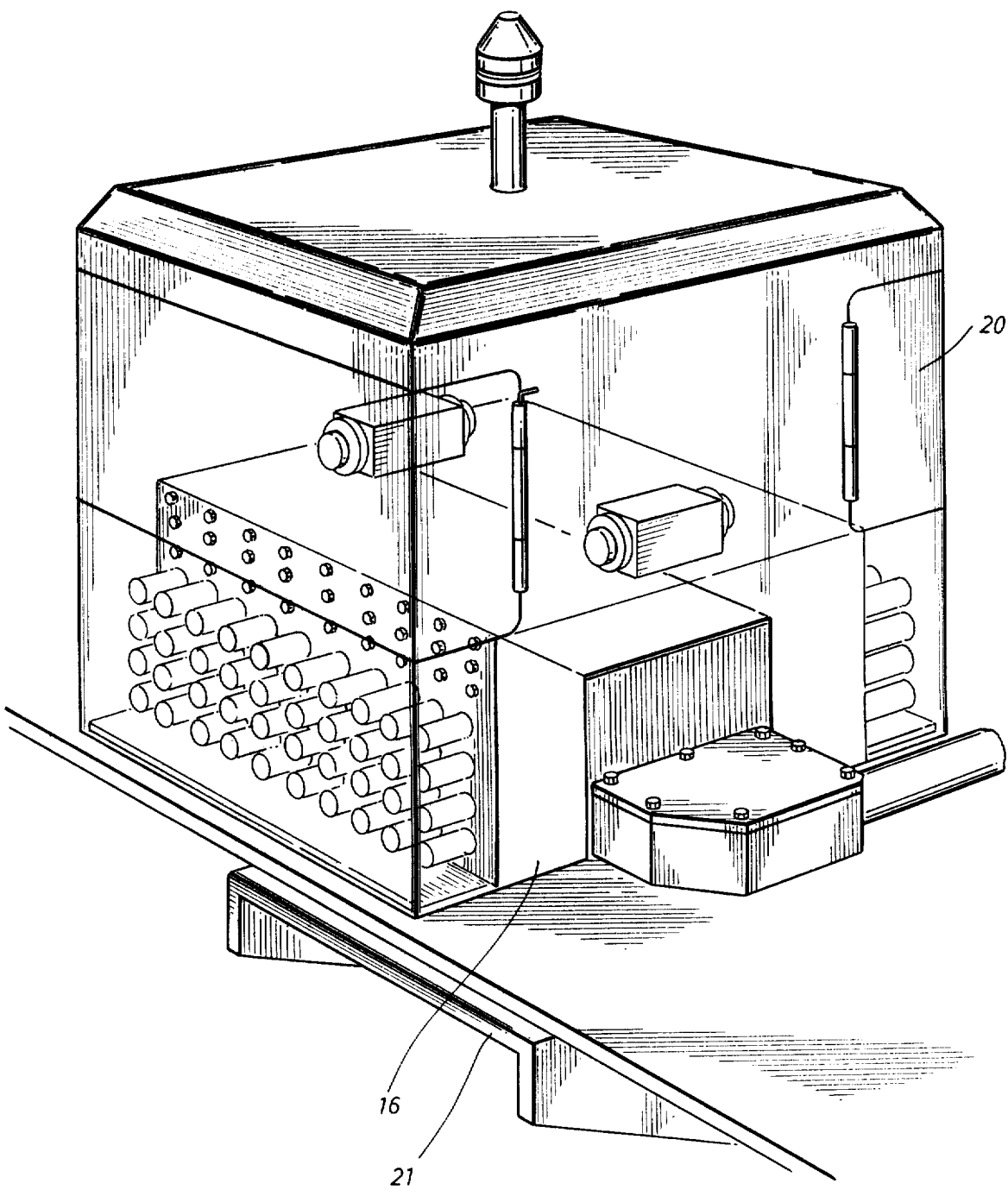
FIG. 2 is a perspective elevational view of the present invention in a assembled position.

The retrievable member 20, as best seen in FIGS. 1 and 2, is an inverted U-shaped retrievable female member having first and second flat opposing interior faces 50 and 52 which are directed upwardly, preferably vertically, and are adapted to be aligned with the flat sides of the male members 14, 16 and 18. Thus face 50 is adapted to be aligned with sides 36, 40 and 26 of members 14, 16 and 18 respectively. Similarly, face 52 is adapted to be aligned with sides 38, 42 and 28 of male members 14, 16 and 18 respectively.

The female member 20 includes a plurality of passageways 54 extending from ports 56 of the faces 50 and 52 which are adapted to be axially aligned with and coact with the fluid passageways in the male members 14, 16 and 18. The female member 20 receives hydraulic supply and control lines from a hose bundle (not shown) which is conventional and which can be supplied directly to or controlled by means of a plurality of improved valves 60 of the present invention for controlling the passage of fluids through the passageways 54.

However, the interior faces 50 and 52 of the retrievable member 20 do not engage the exterior faces of the male members 14, 16 and 18. For example, as best seen in FIGS. 3 and 4, the face 50 of the female member 20 is spaced from the face 26 of the male member 18 providing a space 62 therebetween. The space 62 provides a path for venting fluid from the passageways 30 thereby eliminating this function from the control valve 60. In addition, fixed seals are not required between the female member 20 and the male members 14, 16 and 18 which might be subject to wear and tear on engagement and disengagement. The valves 60 are threadably secured in the exterior sides of the member 20 and extend into each of the passageways 54. The valve 60 includes a movable valve element 62 connected to actuating means such as a stem 64 which is yieldably urged to one position by a spring 66 and is moved to a second position by a piston 68 exposed to fluid pressure in a pilot port 70. The valves 60 include a hydraulic fluid supply port 72 in communication with a hydraulic fluid supply manifold 74 in the member 20.

When pilot fluid is supplied to the port 70, the valve element 62 is extended to seat on a valve seat 76 as best seen in FIG. 4. A valve seat 76 is releasably connected such as by threads 80 to each of the members 14, 16 and 18 about their fluid passageways such as passageway 30 in member 18. The valve element 62 includes a resilient seal 82 for coacting with and seating on the valve seat 76. The seat 76 is made of metal, preferably stainless steel, which is not affected to a great extent by wear and can remain underwater for long lengths of time without replacing. However, the resilient seal 82 may be replaced when the retrievable member 20 is retrieved. The steel seat 76 includes a circular lip 84 which has a width less than the width of the resilient seal 82 and which therefore provides a higher unit sealing force when the seal 82 seats on the seat 76.

As best seen in FIG. 3, when the valve element 62 is moved to a second position the second end 86 seats on another resilient seat 88 and closes the fluid supply port 72 shutting off the supply of fluid to the passageway 30 and allows the fluid in the passageway 30 to vent to the space 62. It is to be noted that in FIG. 3, the resilient seal 82 is retracted in the passageway 54 and is therefore not subject to engagement with the male members 14, 16 and 18 as the female member 20 is engaged and disengaged.

Referring to FIG. 5, the sealing components of the valve 60 are best seen starting with the valve element 62, and a seal ring 63 which is positioned between the threaded connection between the resilient seal 82 and the valve element 62. The valve seat 76 is connected about the passageways by the thread 80 and a seal 81 and includes suitable indentations 83 for threading the seats 76 by means of the thread 80 into the male members 14, 16 and 18.

The present invention, therefore, is well adapted to carry out the objects and attain the ends and advantages mentioned as well as others inherent therein. While a presently preferred embodiment of the invention has been given for the purpose of disclosure, numerous changes in the details of construction and arrangement of parts will be readily apparent to those skilled in the art and which are encompassed within the spirit of the invention and the scope of the appended claims.

What is claimed is:

1. An underwater connector for interconnecting a plurality of fluid lines comprising, a first member adapted to be positioned underwater, said member including at least one upright positioned flat side having a plurality of fluid passageways terminating at said side, a second member adapted to engage and disengage from said first member, said second member including at least one upright positioned flat face for alignment with but spaced from the first member flat side when engaged for providing a venting space therebetween and having a plurality of passageways terminating at said second member flat face for axial alignment with the first member passageways, a valve seat releasably connected to the first member flat side about each of the first member passageways, a valve positioned in each of the second member passageways having a movable valve element, and having a hydraulic fluid supply port, and pilot actuated means connected to and actuating the valve element, and said valve element when moved to one position seats on the valve seat on the first member and opens the fluid supply port for providing actuating fluid to the second member, and when moved to a second position closes the fluid supply port and is removed from the valve seat for allowing fluid in the first member to vent into said space.

2. The apparatus of claim 1 including, a resilient seal connected to said valve element and adapted to seat on the valve seat, and said valve seat being of metal.

3. The apparatus of claim 2 wherein the seat and said seal are circular and the seat includes a circular lip having a width less then the width of the resilient seal for providing higher unit sealing forces.

4. An underwater connector for interconnecting a plurality of fluid lines comprising, a first male member adapted to be positioned underwater, said member having first and second exterior opposing flat sides, and having a plurality of fluid passageways extending from each side, an inverted U-shaped retrievable female member having first and second flat interior faces and adapted to engage and disengage from said first member, said faces positioned for alignment with but spaced from the first member flat sides when engaged for providing a venting space therebetween and having a plurality of passageways terminating at said interior faces for axial alignment with the first member passageways, a metal valve seat releasably connected to the first member flat sides about each of the first member passageways, a valve positioned in each of the second member passageways having a movable valve element, and having a hydraulic supply port, and pilot actuated means connected to and actuating the valve element, said valve element when moved to one position seats on the valve seat on the first member and opens the fluid supply port for providing actuating fluid to the second member, and when moved to a second position closes the fluid supply port and is removed from the valve seat for allowing fluid in the first member to vent into said space, and a resilient seal connected to said valve element and adapted to seat on the metal valve seat.

5. The apparatus of claim 4 wherein the seat and said seal are circular and the seat includes a circular lip having a width less than the width of the resilient seal for providing higher unit sealing forces.

* * * * *